United States Patent [19]

Olson

[11] Patent Number: 5,022,179
[45] Date of Patent: Jun. 11, 1991

[54] INSECT TRAPPING DEVICE

[75] Inventor: Earle L. Olson, Medina, Ohio

[73] Assignee: Olson Products, Inc., Medina, Ohio

[21] Appl. No.: 461,829

[22] Filed: Jan. 8, 1990

[51] Int. Cl.⁵ .............................................. A01M 1/14
[52] U.S. Cl. ..................................................... 43/114
[58] Field of Search ................ 43/107, 114, 115, 118, 43/119

[56] References Cited

U.S. PATENT DOCUMENTS

| | | | |
|---|---|---|---|
| 402,870 | 5/1889 | Trenner . | |
| 469,021 | 2/1892 | Smith . | |
| 476,087 | 5/1892 | Smith | 43/114 |
| 569,083 | 10/1896 | Belknap . | |
| 1,087,058 | 2/1914 | Zielfeldt | 43/114 |
| 1,112,064 | 9/1914 | Gordon | 43/114 |
| 1,814,471 | 7/1931 | Grove . | |
| 2,143,043 | 1/1939 | Wexler | 43/108 |
| 2,264,875 | 12/1941 | Greueing | 43/114 |
| 2,389,870 | 11/1945 | Reevely | 47/57.5 |
| 2,911,756 | 11/1959 | Geary | 43/114 |
| 3,398,478 | 8/1968 | Pearsall | 43/114 |
| 3,653,145 | 4/1972 | Stout | 43/131 |
| 3,816,956 | 6/1974 | Sekula | 43/114 |
| 3,826,036 | 7/1974 | Neugebauer | 43/131 |
| 4,031,654 | 6/1977 | Gray | 43/114 |
| 4,048,747 | 9/1977 | Shanahan et al. | 43/114 |
| 4,133,137 | 1/1979 | van Adelsberg | 43/114 |
| 4,244,134 | 1/1981 | Otterson | 43/114 |
| 4,400,909 | 8/1983 | Reese | 47/2 |
| 4,800,671 | 1/1989 | Olson | 43/108 |
| 4,802,302 | 2/1989 | Alnafissa | 43/114 |
| 4,829,702 | 5/1989 | Silvandersson | 43/114 |
| 4,876,823 | 10/1989 | Brunetti | 43/114 |

FOREIGN PATENT DOCUMENTS

| | | | |
|---|---|---|---|
| 191039 | 10/1907 | Fed. Rep. of Germany | 43/114 |
| 16529 | of 1893 | United Kingdom . | |
| 406282 | 2/1934 | United Kingdom | 43/114 |

Primary Examiner—Kurt Rowan
Attorney, Agent, or Firm—Reese Taylor

[57] ABSTRACT

An insect trapping device for mounting on a support surface, such as a window, includes an elongate, substantially flat body divided into first, second and third sections which can be folded so that the first section, which carries a surface adhering element such as pressure sensitive adhesive, can be secured to the window with the second section projecting normally to the plane of the window and carrying a quantity of insect trapping adhesive and with the third section projecting upwardly from the second section so as to screen off the second section and any insects trapped therein.

9 Claims, 1 Drawing Sheet

INSECT TRAPPING DEVICE

RELATED PATENT APPLICATIONS

None.

BACKGROUND OF THE INVENTION

This invention relates in general to a means for trapping and ultimately destroying insects and relates in particular to a device adapted to be mounted on a vertical surface, such as a window, and capable of carrying a quantity of insect attracting and trapping adhesive material in such a way that the insects trapped thereby are not readily visible.

DESCRIPTION OF THE PRIOR ART

It has long been known that insects can be controlled and destroyed by providing strips of material which include a coating of insect attracting and trapping adhesive. The insects are attracted either by scents impregnated into the adhesive or by the color of the material on which the adhesive is deposited or both, with the result that the insects become trapped by the material and ultimately die. It is also known that insects are attracted to light and, therefore, combining the attracting adhesive with a device which enables it to be mounted close to a source of light, such as window, is a desirable objective.

In general, this art is quite old, going back to what was once called fly paper, and strips of that type of material can be seen, for example, in Stout U.S. Pat. No. 3,653,145. Variations of this general concept can also be seen in Trenner U.S. Pat. Nos. 402,870; Geary 2,911,756; and Neugebauer 3,826,036, as well as British Specification 16,529.

It has also been known in the prior art that trapping devices of this general nature can be applied to various surfaces in contrast to being simply suspended from a ceiling or the like.

One example of such a specialized application of the general concept is applying treated bands to trees, for example, as can be seen in Belknap U.S. Pat. Nos. 569,083; Grove 1,814,471; Wexler 2,143,043; Reevely 2,389,870; Reese 4,400,909; and Olson 4,800,671.

It has also been known in the prior art to attach material or devices containing the insect trapping material to vertical surfaces, such as walls or windows. Examples of such applications can be seen in Shanahan U.S. Pat. No. 4,048,747 and Silvandersson U.S. Pat. No. 4,829,702.

Silvandersson is of particular interest to the present invention in that it does disclose an insect trap which is intended to be mounted on a vertical surface and particularly on a window. However, the trap of Silvandersson, and particularly the surface thereof which is coated with the insect attracting and trapping material, is readily visible to the naked eye. Therefore, while such a device will presumably attract, trap and destroy the insects, the result, unless it is changed frequently, is an extremely unsightly arrangement.

Accordingly, it is believed that it would be desirable to provide the functional characteristics of attracting, trapping and destroying flying insects while enhancing the aesthetic characteristics of such a device.

SUMMARY OF THE INVENTION

It is, accordingly, a principal object of the invention to provide an insect trapping device for mounting on a support surface which is capable of being securely mounted to and readily removed from that support surface; is capable of attracting and trapping flying insects; and is capable of hiding the insects thus trapped from view.

In furtherance of the principal object of the invention, it has been found that on elongate, substantially flat body can be provided and, in one form of the invention, can be provided with score lines so as to divide the body into first, second and third sections.

Also in furtherance of the principal object of the invention, it has been found that means for adhering the first section to the window can be provided, while the insect attracting material can be provided on a second section which projects out from the window and wherein the third section can be disposed so as to effectively hide the second section from view.

Accordingly, production of an improved insect trapping device of the character above-described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
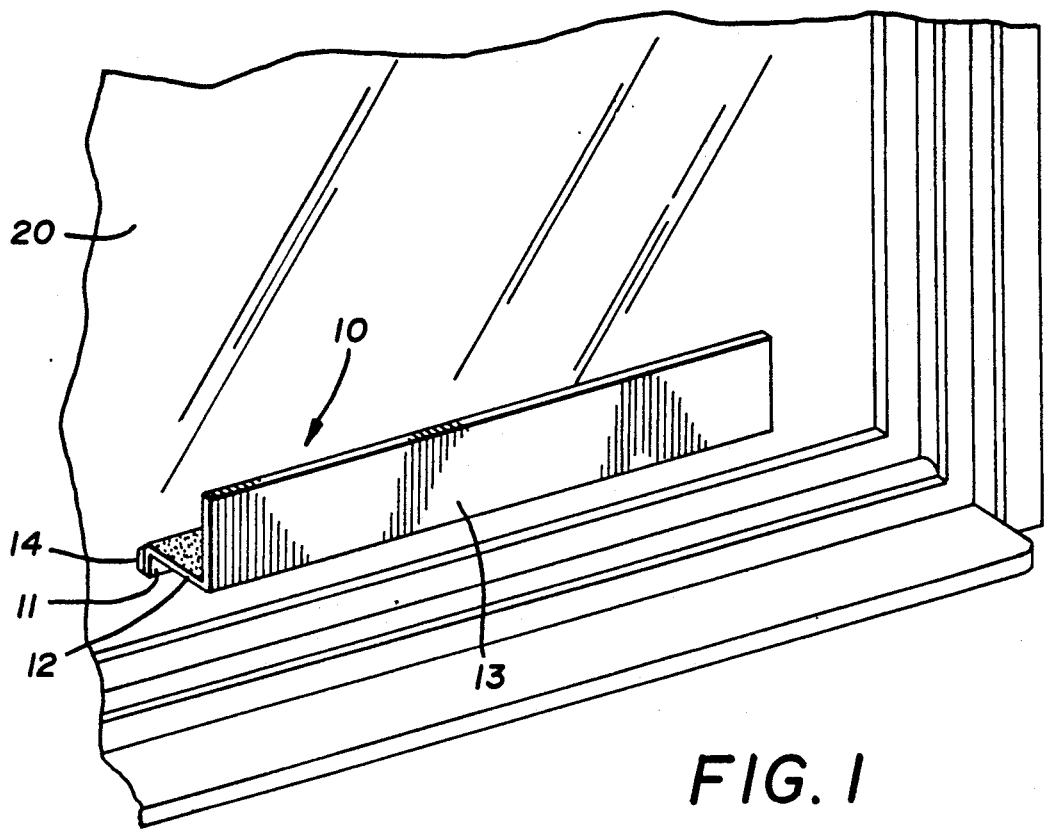
FIG. 1 is a perspective view showing the improved insect trapping device in place on a window surface.
Figure 2:
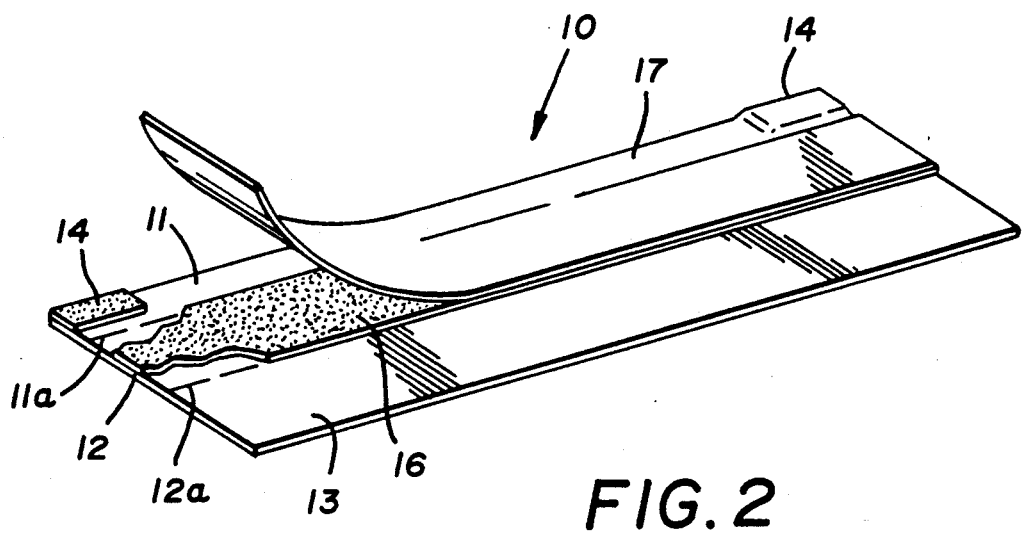
FIG. 2 is a perspective view, partially broken away, showing the insect trapping device before it has been configured for attachment to the support surface.

Referring then to FIGS. 1 and 2 of the drawings, it will be noted that the improved insect trapping device, generally indicated by the numeral 10, is a preferably, initially, flat, elongated strip of material and may be fabricated of any desired low-cost, light-weight material, such as plastic, paper, cardboard, etc.

The insect trapping device 10 is effectively divided into first, second and third sections, designated by the numerals 11, 12 and 13, which are contiguous with each other or, in other words, form an integral unit, but which, in the preferred form of the invention, are divided into the three sections by score lines 11a and 12a. It will be noted that the score lines are optional in that the application of the surface adhering means and the insect trapping adhesive as described below will serve to delineate the sections. However, provision of the score lines will greatly facilitate use of the device as will become apparent.

In that regard, it is contemplated that, in the preferred form of the invention, the insect trapping device 10 would be manufactured, shipped and stored in flat form, as illustrated in FIG. 2 of the drawings, for convenience in handling and shipping, and then folded into the configuration of FIG. 1 at the site of use. Thus, score lines 11a and 12a will assist in the folding operation. However, it is also possible to construct the insect trapping device 10 in a prefolded condition, as illustrated in FIG. 1.

Turning again then to FIG. 2 of the drawings particularly, it will be noted that the first section 11 carries surface adhering means 14, 14 which, in the form of the invention illustrated, comprise strips of material glued or otherwise affixed to the first section 11 and having an exposed surface which contains pressure-sensitive adhesive of the type which would permit the device to be affixed to the window 20 and then removed therefrom. Other surface adhering means could be employed, such as suction cups for example. It will also be noted that, rather than short strips as illustrated, these adhering means could also extend along the entire length of section 11.

The second section 12 of the insect trapping device 10, as illustrated in FIG. 2, is separated from the first by the score line 11a and is coated with an insect trapping adhesive of a type generally well-known in the industry. The invention is not intended to be limited to any particular insect trapping adhesive 16. Also, it will be understood by those knowledgeable in the art that this adhesive could be impregnated with an insect attracting scent, if desired. Thus, reference herein to an insect trapping adhesive is intended to include an adhesive so impregnated.

The third section 13 of the insect trapping device 10 is again part of a single piece of material in the preferred form of the invention and, as illustrated in FIG. 2, is separated from the second section 12 by the score line 12a. However, as previously noted, even if the score lines were omitted, the device will be effectively divided into three sections for installation by the presence of the coated surfaces.

Finally, a strip of release material, such as kraft paper or some similar material, is indicated by the numeral 17 and is intended to cover both the surface adhering means 14 and the insect trapping adhesive 16 or, in other words, the first and second sections of the insect trapping device 10.

In Use or operation, and referring to FIG. 2 of the drawings, preferably, the device 10 will first be folded to the S-shaped configuration of FIG. 1 wherein the first section 11 is disposed in a plane substantially normal to the plane of the second section 12, and the third section 13 is disposed in a plane substantially normal thereto as well. However, it will be readily seen that the first section projects from the plane of the second section 12 in a first direction, while the third section 13 projects therefrom in a second direction so as to give the S-shaped configuration shown in FIG. 1. Following this step, the release material 17 can be removed so that the device is ready for installation.

As can be seen in FIG. 1 of the drawings, the first section 11 is affixed to the window with the second section 12 projecting outwardly therefrom, and the third section 13 projecting upwardly and substantially parallel to the plane of the window.

It will, therefore, be readily apparent, particularly from FIG. 1 of the drawings, that insects attracted to the window or the light shining through the window will also be attracted to the insect attracting adhesive layer 16 received on the second section 12 and, once attracted thereto, will be stuck therein and ultimately will die. However, in order to avoid having to change the device with undue frequency in order to avoid an unsightly mess on the window, the third section 13 will effectively screen the dead insects from view.

While a full and complete description of the invention has been set forth in accordance with the dictates of the patent statutes, it should be understood that modifications can be resorted to without departing from the spirit hereof or the scope of the appended claims.

Thus, the device has been illustrated and described as being mounted on a window, it could readily be mounted on any vertical surface, such as a door, for example.

What is claimed is:

1. An insect trapping device for mounting on a support surface, comprising:
    (a) an elongate, substantially flat body having opposed first and second surfaces;
    (b) said body consisting of first, second and third elongate sections said first section being contiguous with said second section and said third section being contiguous with said second section;
    (c) support surface adhering means disposed on said first surface of said first section for engagement with the support surface;
    (d) a quantity of insect trapping adhesive disposed on said first surface of said second section; and
    (e) said third sections is uncoated.

2. The insect trapping device of claim 1 wherein a layer of release material is releasably disposed on said surface adhering means and said insect attracting adhesive.

3. The insect trapping device of claim 1 wherein said surface adhering means include a pressure sensitive adhesive.

4. The insect trapping device of claim 1 wherein said surface adhering means and said insect trapping adhesive are disposed on contiguous surfaces of said body.

5. The insect trapping device of claim 1 wherein said first section is foldable to lie in a plane substantially normal to the plane of said second section.

6. The insect trapping device of claim 5 wherein said third section is foldable to lie in a plane substantially normal to the plane of said second section and substantially parallel to the plane of said first section when folded.

7. The insect trapping device of claim 1 wherein said first, second and third sections are separated by longitudinally extending score lines.

8. An insect trapping device for mounting on a support surface, comprising:
    (a) an elongate body having opposed first and second surfaces including:
        (1) a first elongate section for attachment to the support surface;
        (2) a second elongate section contiguous with said first section and disposed in a plane substantially normal to the plane of said first section and the support surface when said first section is attached thereto, and
        (3) a third elongate section contiguous with said second section and disposed in a plane substantially normal to the plane of said second section and substantially parallel with that of said first section and to the plane of the support surface;
    (b) said first section projecting in a first direction with respect to the plane of said second section and said third section projecting in a second direction with respect thereto;
    (c) support surface engaging means disposed on said first first section for engaging the support surface; and
    (d) a quantity of insect attracting adhesive disposed on said first surface of said second section.

9. The insect attracting device of claim 7 wherein said surface engaging means include a pressure sensitive adhesive.

UNITED STATES PATENT AND TRADEMARK OFFICE
CERTIFICATE OF CORRECTION

PATENT NO. : 5,022,179

DATED : June 11, 1991

INVENTOR(S) : Earle L. Olson

It is certified that error appears in the above-identified patent and that said Letters Patent is hereby corrected as shown below:

In Column 1, line 27, between the words "as" and "window", insert the word --a--.

In Column 2, line 7, delete the word "on" and substitute therefor --an--.

In Column 2, line 37, delete the word "elongated" and substitute therefor --elongate--.

Column 3, line 66, between the words "Thus," and "the", insert the word --while--.

In Column 4, line 17, delete the word "sections" and substitute therefor --section--.

In Column 4, line 60, between the words "first" and "first", insert the words --surface of said--.

Signed and Sealed this

Twentieth Day of October, 1992

Attest:

DOUGLAS B. COMER

*Attesting Officer*  *Acting Commissioner of Patents and Trademarks*